United States Patent
Ahn et al.

(10) Patent No.: US 10,911,972 B2
(45) Date of Patent: *Feb. 2, 2021

(54) APPARATUS AND METHOD FOR PERFORMING MEASUREMENT REPORT CONSIDERING IN-DEVICE COEXISTENCE INTERFERENCE

(71) Applicant: Pantech Corporation, Seoul (KR)

(72) Inventors: Jae Hyun Ahn, Seoul (KR); Ki Bum Kwon, Seoul (KR); Myung Cheul Jung, Seoul (KR)

(73) Assignee: PANTECH CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/288,278

(22) Filed: Feb. 28, 2019

(65) Prior Publication Data

US 2019/0200252 A1    Jun. 27, 2019

Related U.S. Application Data

(63) Continuation of application No. 15/921,817, filed on Mar. 15, 2018, now abandoned, which is a
(Continued)

(30) Foreign Application Priority Data

Feb. 12, 2011   (KR) .................. 10-2011-0012590

(51) Int. Cl.
*H04W 24/10* (2009.01)
*H04W 24/02* (2009.01)
(Continued)

(52) U.S. Cl.
CPC .......... *H04W 24/10* (2013.01); *H04B 17/345* (2015.01); *H04B 17/373* (2015.01);
(Continued)

(58) Field of Classification Search
CPC .... H04W 24/10; H04W 24/02; H04B 17/373; H04B 17/382
(Continued)

(56) References Cited

U.S. PATENT DOCUMENTS

2005/0083997 A1   4/2005  Du et al.
2012/0164948 A1*  6/2012  Narasimha ........ H04W 72/1215
                                                     455/63.1
(Continued)

FOREIGN PATENT DOCUMENTS

CN        1615597      5/2005
CN        1666540      9/2005
(Continued)

OTHER PUBLICATIONS

CMCC, Huawei, "Framework and procedure of in-device coexistence Interference avoidance," 3GPP TSG-RAN WG2, Meeting #72bis, R2-110391, Jan. 17-21, 2011, Dublin, Ireland.
(Continued)

*Primary Examiner* — John J Lee
(74) *Attorney, Agent, or Firm* — Capitol IP Law Group, PLLC

(57) ABSTRACT

The present invention relates to an apparatus and a method for performing measurement reporting considering in-device coexistence interference. The present invention provide a user equipment transmitting a measurement report in a wireless communication system, comprising an interference detection unit, an assistant information generation unit, a measurement controller and a transmitter. According to the present invention, a measurement procedure can be clearly defined in an interference delicate band where in-device coexistence interference occurs and scheduling restrictions on an eNodeB due to measurement reporting about an interference delicate band can be reduced.

17 Claims, 15 Drawing Sheets

Related U.S. Application Data continuation of application No. 15/341,296, filed on Nov. 2, 2016, now Pat. No. 9,955,376, which is a continuation of application No. 14/937,348, filed on Nov. 10, 2015, now Pat. No. 9,516,538, which is a continuation of application No. 13/984,476, filed as application No. PCT/KR2012/001031 on Feb. 10, 2012, now Pat. No. 9,191,833.

(51) Int. Cl.
| | | |
|---|---|---|
| H04W 36/00 | (2009.01) | |
| H04B 17/345 | (2015.01) | |
| H04B 17/373 | (2015.01) | |
| H04B 17/382 | (2015.01) | |
| H04J 1/00 | (2006.01) | |
| H04J 3/00 | (2006.01) | |

(52) U.S. Cl.
CPC .............. *H04B 17/382* (2015.01); *H04J 1/00* (2013.01); *H04J 3/00* (2013.01); *H04W 24/02* (2013.01); *H04W 36/0094* (2013.01)

(58) Field of Classification Search
USPC ... 455/501, 63.1, 67.13, 67.11, 115.1, 114.2, 455/452.1, 423
See application file for complete search history.

(56) References Cited

U.S. PATENT DOCUMENTS

| | | | |
|---|---|---|---|
| 2012/0213162 A1* | 8/2012 | Koo | ................. H04W 16/14 370/329 |
| 2012/0236736 A1 | 9/2012 | Frank et al. | |
| 2013/0279423 A1* | 10/2013 | Ahn | ................. H04W 72/1215 370/328 |
| 2014/0031036 A1* | 1/2014 | Koo | ................. H04W 36/20 455/434 |

FOREIGN PATENT DOCUMENTS

| | | |
|---|---|---|
| CN | 101677290 | 3/2010 |
| JP | 08-279800 | 10/1996 |
| WO | 2008/130297 | 10/2008 |

OTHER PUBLICATIONS

ZTE, "Considerations on the detail procedure for FDM approach," 3GPP TSG-RAN WG2 Meeting #72bis, R2-110243, Jan. 17-21, 2011, Dublin, Ireland.

Intel, "Overall framework for in-device coexistence," 3GPP TSG-RAN WG2 Meeting #72bis, R2-110228, Jan. 17-21, 2011, Dublin, Ireland.

Motorola Mobility, "Evaluation of Coexistence Interference," 3GPP TSG-RAN WG2#72bis, R2-110327, Jan. 17-21, 2011, Dublin Ireland.

International Search Report dated Aug. 28, 2012 in International Application No. PCT/KR2012/001031.

Ex parte Quayle dated Apr. 23, 2015, in U.S. Appl. No. 13/984,476.

Notice of Allowance dated Jul. 8, 2015, in U.S. Appl. No. 13/984,476.

Non-Final Office Action dated Dec. 30, 2015, in U.S. Appl. No. 14/937,348.

Notice of Allowance dated Jul. 27, 2016, in U.S. Appl. No. 14/937,348.

ZTE, "Discussion on the DRX based TOM approach", 3GPP TSG-RAN WG2 Meeting #72bis, R2-110264, Jan. 17-21, 2011, 6 pages, Dublin, Ireland.

Office Action issued by CNIPA dated Dec. 5, 2018 for the corresponding CN Application No. 201610397886.7.

* cited by examiner

APPARATUS AND METHOD FOR PERFORMING MEASUREMENT REPORT CONSIDERING IN-DEVICE COEXISTENCE INTERFERENCE

CROSS-REFERENCE TO RELATED APPLICATIONS

This application is a continuation of U.S. patent application Ser. No. 15/921,817, filed on Mar. 15, 2018, which is a continuation of U.S. patent application Ser. No. 15/341,296, filed on Nov. 2, 2016, which is a continuation of U.S. patent application Ser. No. 14/937,348, filed on Nov. 10, 2015, which is a continuation of U.S. patent application Ser. No. 13/984,476, filed on Aug. 8, 2013, now issued as U.S. Pat. No. 9,191,833, which is the National Stage Entry of International Application No. PCT/KR2012/001031, filed on Feb. 10, 2012, and claims priority from and the benefit of Korean Patent Application No. 10-2011-0012590, filed on Feb. 12, 2011, each of which is incorporated herein by reference for all purposes as if fully set forth herein.

BACKGROUND

Field

The present invention relates to wireless communication, more specifically, an apparatus and a method for performing measurement reporting considering in-device coexistence interference.

Discussion of the Background

In general, a wireless communication system occupies a frequency range consisting of single bandwidth. For example, the 2nd generation wireless communication system uses frequency bandwidth ranging from 200 KHz to 1.25 MHz and the 3rd wireless communication system uses bandwidth ranging from 5 MHz to 10 MHz. To support increasing transmission capacity, the recent 3rd Generation Partnership Project (3GPP) Long Term Evolution (LTE) or the IEEE 802.16m is expanding the bandwidth up to 20 MHz or beyond. Extending bandwidth is necessary to accommodate increasing transmission capacity; however, maintaining large bandwidth may cause considerable power consumption in a case where quality of service required is low.

Therefore, multiple component carrier systems are now emerging, which define a carrier wave with a frequency spectrum consisting of single bandwidth and a center frequency and are capable of transmitting and/or receiving broadband data through a plurality of carrier waves. That is, by using one or more carrier waves, frequency spectrums of narrow and broad bandwidth are supported at the same time. For example, if one carrier wave corresponds to bandwidth of 5 MHz, bandwidth up to 20 MHz can be supported by using four carrier waves.

Due to ubiquitous access network nowadays, users at different places can access networks different from one another and maintain connectivity continuously regardless of their current locations. In the conventional situation where a user equipment performs communication only with a single network, a user used to carry separate devices supporting the respective network systems. However, as functions provided by a single user equipment become more advanced and complicated, user equipments of today are capable of performing communication with a plurality of networks at the same time, thereby increasing user convenience.

However, if a user equipment performs communication simultaneously across frequency bands of a plurality of network systems, in-device coexistence interference may occur. The in-device coexistence interference refers to the phenomenon where transmission through some frequency band causes interference in receiving data through a different frequency band. For example, if a user equipment supports both the Bluetooth and the LTE system, the in-device coexistence interference may occur in the corresponding frequency bands of the Bluetooth and the LTE system. The in-device coexistence interference often occurs when spacing between boundaries of frequency bands of different network systems is not sufficiently secured.

However, wireless communication systems of today do not support a specific means for coordinating in-device coexistence interference. In other words, a specific means for solving in-device coexistence interference between a user equipment and an eNB has not been established yet; thus, a specific operating procedure for solving the interference problem is needed.

SUMMARY

One object of the present invention is to provide an apparatus and a method for performing measurement reporting considering in-device coexistence interference.

Another object of the present invention is to provide an apparatus and a method for performing measurement in an interference delicate band where in-device coexistence interference occurs.

Yet another object of the present invention is to provide an apparatus and a method for performing measurement reporting considering interference in an interference delicate band where in-device coexistence interference occurs.

Still another object of the present invention is to provide an apparatus and a method for performing measurement reporting by removing interference in an interference delicate band where in-device coexistence interference occurs.

A further object of the present invention is to provide an apparatus and a method for performing measurement reporting considering interference and performing measurement reporting by removing interference simultaneously in an interference delicate band where in-device coexistence interference occurs.

According to one aspect of the present invention, provided is a user equipment transmitting a measurement report in a wireless communication system comprises an interference detection unit detecting interference caused by transmission of a first frequency band in a first network system against reception of a second frequency band in a second network system and controlling a UE to avoid the second frequency band, an assistant information generation unit generating assistant information indicating occurrence of the interference of the second frequency band or a probability of occurrence of the interference, a measurement controller obtaining at least one of measurement samples by performing measurement about the second frequency band based on at least one among a first measurement rule obtaining measurement samples in an interval when the interference does not occur, a second measurement rule obtaining measurement samples in an interval when the interference does not occur and measurement samples by removing in-device coexistence interference by using an interference removal method in an interval when the interference occurs, and a third measurement rule obtaining a first measurement sample reflecting the interference and a second measurement sample by removing the interference in an interval when the interference occurs and generating a measurement report including measurement values obtained by filtering of the at least one of measurement samples and a transmitter transmitting the assistant information or the measurement report to an eNB.

According to another aspect of the present invention, provided is a method for transmitting a measurement report by an UE in a wireless communication system, comprises detecting interference caused by transmission of a first frequency band in a first network system against reception of a second frequency band in a second network system, transmitting assistant information indicating occurrence of the interference or a probability of occurrence of interference of the second frequency band, obtaining at least one of measurement samples by performing measurement about the second frequency band based on at least one among a first measurement rule obtaining measurement samples in an interval when the interference does not occur, a second measurement rule obtaining measurement samples in an interval when the interference does not occur and measurement samples by removing in-device coexistence interference by using an interference removal method in an interval when the interference occurs, and a third measurement rule obtaining a first measurement sample reflecting the interference and a second measurement sample by removing the interference in an interval when the interference occurs and transmitting a measurement report including measurement values obtained by filtering of the at least one of measurement samples.

According to yet another aspect of the preset invention, provided is an eNB receiving a measurement report in a wireless communication system, comprises a receiver receiving assistant information indicating occurrence of interference caused by transmission of a first frequency band in a first network system against reception of a second frequency band in a second network system or a probability of occurrence of the interference from an UE and a transmitter transmitting responding information indicating coordination of the interference based on the assistant information to the UE, wherein the receiver receives a measurement report including measurement values obtained by filtering of at least one of measurement samples obtained by performing measurement about the second frequency band based on at least one among a first measurement rule obtaining measurement samples in an interval when the interference does not occur, a second measurement rule obtaining measurement samples in an interval when the interference does not occur and measurement samples by removing in-device coexistence interference by using an interference removal method in an interval when the interference occurs, and a third measurement rule obtaining a first measurement sample reflecting the interference and a second measurement sample by removing the interference in an interval when the interference occurs from the UE.

According to still another aspect of the present invention, provided is a method for receiving a measurement report by an eNB in a wireless communication system, comprises receiving assistant information indicating occurrence of interference caused by transmission of a first frequency band in a first network system against reception of a second frequency band in a second network system or a probability of occurrence of the interference from an UE, transmitting responding information indicating coordination of the interference based on the assistant information to the UE and receiving a measurement report including measurement values obtained by filtering of at least one of measurement samples obtained by performing measurement about the second frequency band based on at least one among a first measurement rule obtaining measurement samples in an interval when the interference does not occur, a second measurement rule obtaining measurement samples in an interval when the interference does not occur and measurement samples by removing in-device coexistence interference by using an interference removal method in an interval when the interference occurs, and a third measurement rule obtaining a first measurement sample reflecting the interference and a second measurement sample by removing the interference in an interval when the interference occurs from the UE.

According to the present invention, a measurement procedure is clearly defined in an interference delicate band where in-device coexistence interference occurs and a subsequent procedure such as handover for a user equipment due to measurement can be performed efficiently. Scheduling restrictions on an evolved NodeB due to measurement reporting about an interference delicate band can be reduced.

DETAILED DESCRIPTION OF THE ILLUSTRATED EMBODIMENTS

In what follows, embodiments of the present invention will be described in detail with reference to illustrative drawings. In assigning reference symbols to constituting elements of each drawing, it should be noted that the same symbols have been assigned to the same constituting elements as possibly as can be even if the elements are used in different drawings. Also, for the sake of describing embodiments of the present invention, if it is regarded that detailed description about related structure or functions already known for the corresponding technical field may lead to misunderstanding of the technical principles of the present invention, the corresponding description will be omitted.

Figure 1:
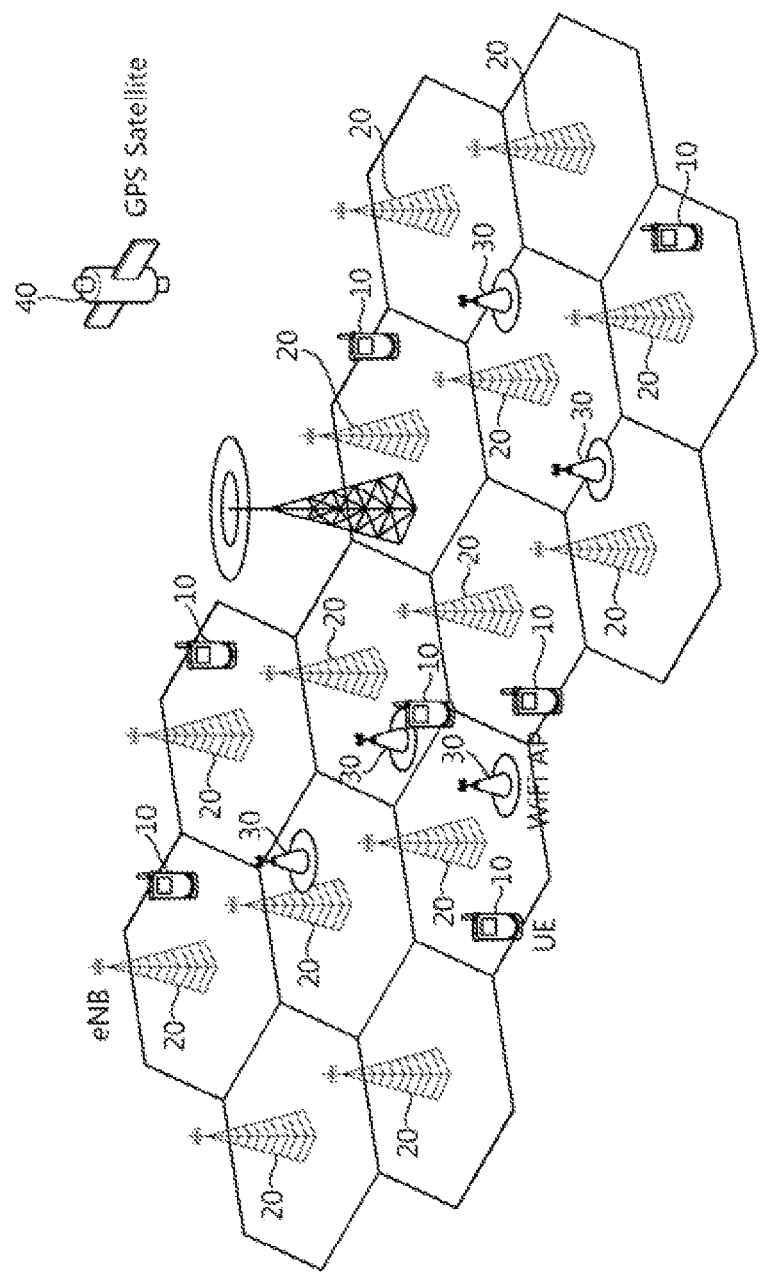
FIG. 1 illustrates a wireless communication system to which embodiments of the present invention are applied.

FIG. 1 illustrates a wireless communication system to which embodiments of the present invention are applied.

With reference to FIG. 1, a wireless communication system is deployed across a wide area to provide various kinds of communication services such as transmission of voice, packet data, and so on; the wireless communication system includes a user equipment (UE) 10, an evolved NodeB (eNB) 20, a wireless LAN access point (AP) 30, and GPS (Global Positioning System) 40 satellites. At this time, the wireless LAN corresponds to a device supporting the IEEE 802.11 technology which is a standard for wireless communication networks and the IEEE 802.11 may be called interchangeably with a WiFi system.

The UE 10 can be positioned within the coverage of a plurality of networks such as a cellular network, a wireless LAN, a broadcasting network, a satellite system, etc. To access various networks such as an eNB 20, a wireless LAN AP 30, GPS 40, etc. and use various services, the UE 10 is equipped with a plurality of wireless transceivers. For example, a smart phone is equipped with an LTE, WiFi, Bluetooth transceiver and a GPS receiver. Thus, to incorporate as many transceivers as possible within a single UE 10 while at the same time maintaining high performance, the design for the UE 10 is getting more complicated. As a result, a possibility of occurrence of in-device coexistence interference may become higher.

In the following, downlink transmission refers to communication from an eNB 20 to a UE 10 while uplink transmission from the UE 10 to the eNB 20. In the downlink transmission, a transmitter may be a part of the eNB 20 in the downlink transmission while a receiver a part of the UE 10. Similarly, in the uplink transmission, the transmitter may be a part of the UE 10 while the receiver a part of the eNB 20.

The UE 10 may be fixed or mobile and can be called in various ways such as a mobile station (MS), a user terminal (UT), a subscriber station (SS), a mobile terminal (MT), a wireless device, etc. The eNB 20 denotes a fixed station communicating with the UE 10 and can be called in various ways such as a base station (BS), a base transceiver system (BTS), an access point, a Femto BS, a Pico BS, a relay, etc.

There is no limit on multiple access methods which can be applied for a wireless communication system. Various kinds of multiple access methods can be used: CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, and so on. Uplink and downlink transmission can employ a TDD (Time Division Duplex) method by which transmission is performed by using different time periods or a FDD (Frequency Division Duplex) method by which transmission is performed by using different frequencies.

Carrier aggregation (CA) supports a plurality of component carriers and alternatively called a spectrum aggregation or bandwidth aggregation. An individual unit carrier grouped by carrier aggregation is called a component carrier (hereinafter, it is called a CC). Each CC is defined by bandwidth and a center frequency. Carrier aggregation is introduced to support increasing throughput and prevent cost increase due to introduction of broadband radio frequency (RF) devices and ensure compatibility with the existing systems. For example, if five CCs are allocated to represent granularity of carrier units having 5 MHz bandwidth, bandwidth with a maximum of 25 MHz can be supported. In what follows, it is assumed that a multiple carrier system denotes a system supporting carrier aggregation. The wireless communication system of FIG. 1 may correspond to a multiple carrier system.

According to carrier aggregation, system frequency bandwidth is divided into a plurality of carrier frequencies. At this time, carrier frequency denotes the center frequency of a cell. A cell may denote a downlink CC and a uplink CC. Also, a cell may be a combination of a downlink CC and an optional uplink CC. In general, if carrier aggregation is not taken into account, a single cell is always constructed in the form of a pair of a uplink and a downlink CC.

Figure 2:
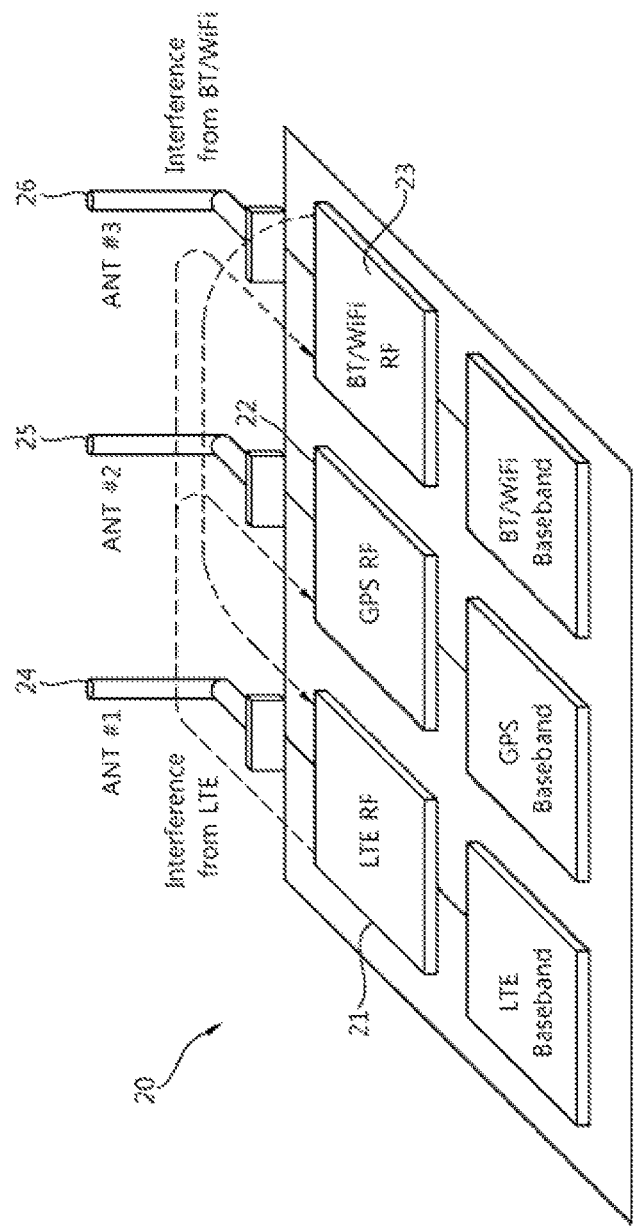
FIG. 2 illustrates in-device coexistence interference.

FIG. 2 illustrates in-device coexistence interference.

Figure 3:
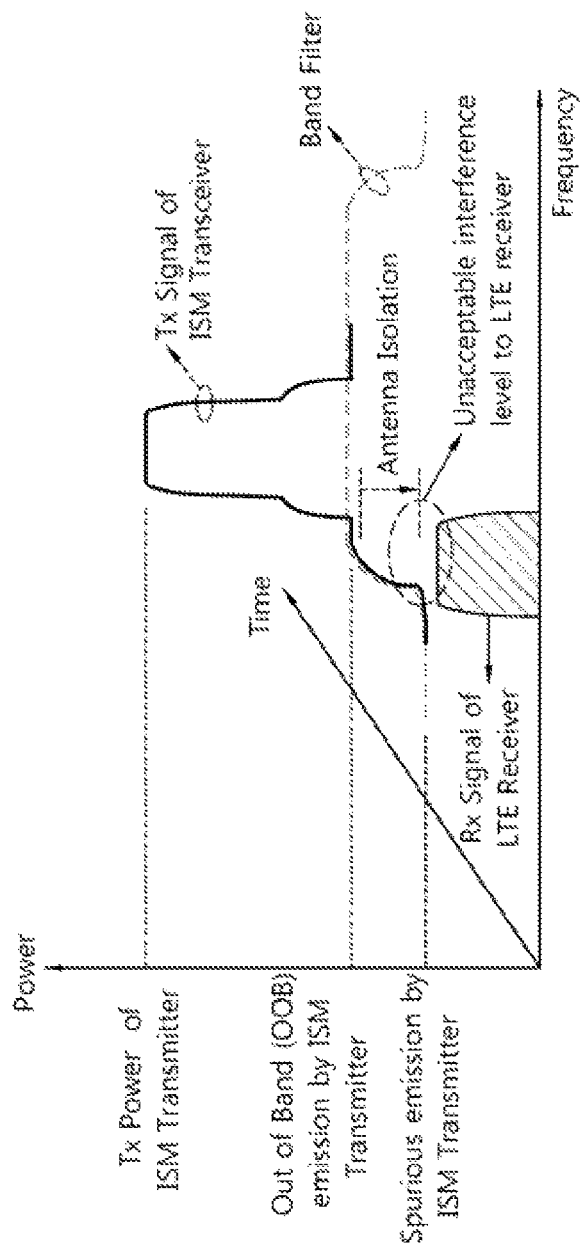
FIG. 3 is an example illustrating in-device coexistence interference from an ISM transmitter to an LTE receiver.

With reference to FIG. 2, a UE 20 includes an LTE RF module 21, a GPS RF module 22, and a Bluetooth/WiFi RF module 23. Each RF module is connected to a transmission and reception antenna 24, 25, 26. In other words, various types of RF modules are installed side by side within a single device platform. At this time, it should be noted that transmission power of an RF module may be significantly larger than the receiving power level of other RF receivers. Therefore, unless frequency spacing between RF modules is sufficiently large and powerful filtering technique is employed, transmission signals from one RF module may cause considerable interference on the receivers of the other RF modules within the device. For example, "(1)" is an example where transmission signals from the LTE RF module 21 causes in-device coexistence interference on the GPS RF 22 and the Bluetooth/WiFi RF module 23 while "(2)" is an example where transmission signals from the Bluetooth/WiFi RF module 23 causes the in-device coexistence interference on the LTE RF module 21. FIG. 3 illustrates this problem in more detail.

FIG. 3 is an example illustrating in-device coexistence interference from an ISM transmitter to an LTE receiver. The Industrial, Scientific and Medical (ISM) band denotes the frequency range which is freely available without permission for industrial, scientific, and medical applications.

FIG. 3 assumes that the frequency band of a signal received by the LTE receiver overlaps the frequency band of a transmission signal of the ISM transmitter. In this case, in-device coexistence interference may occur. As shown in the figure, the frequency band where in-device coexistence interference occurs; a potential probability for occurrence of interference is high; or interference is expected to occur is called an in-device coexistence interference delicate band or an interference delicate band for short. Since the interference delicate band may correspond to a frequency band unavailable for a UE, it may also be called a unusable band. An interference delicate band does not necessarily mean occurrence of in-device coexistence interference; a frequency band with a potential probability of occurrence of interference may also be termed as an interference delicate band.

Figure 4:
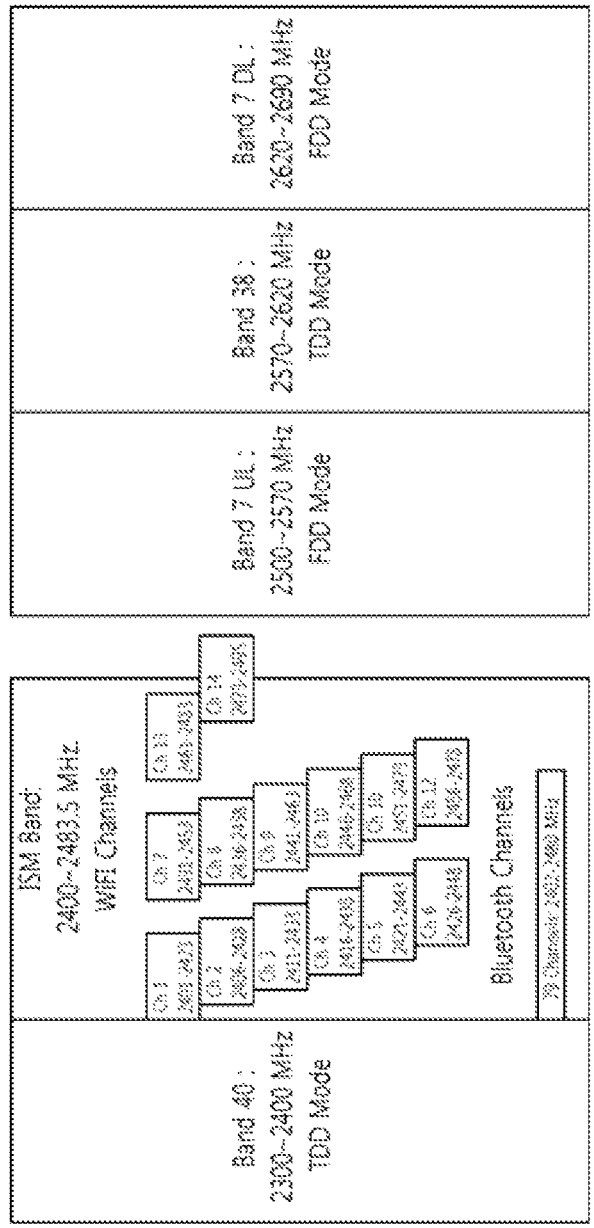
FIG. 4 is an example illustrating a frequency band divided into an ISM band and an LTE band.

FIG. 4 is an example illustrating a frequency band divided into an ISM band and an LTE band.

With reference to FIG. 4, band 40, band 7, and band 38 are LTE bands. The band 40 occupies a frequency band ranging from 2300 to 2400 MHz in the TDD mode; the band 7 is a uplink in the FDD mode occupying a frequency band ranging from 2500 to 2570 MHz. The band 38 occupies a frequency band ranging from 2570 to 2620 MHz in the TDD mode. Meanwhile, the ISM band is used as a WiFi and Bluetooth channel, occupying a frequency band ranging from 2400 to 2483.5 MHz. These bands are usually classified as interference delicate bands. The following table shows how the in-device coexistence interference is developed for the respective frequency bands.

TABLE 1

| Interference frequency band | Interference pattern |
| --- | --- |
| Band 40 | ISM Tx -> LTE TDD DL Rx |
| Band 40 | LTE TDD UL Tx -> ISM Rx |
| Band 7 | LTE FDD UL Tx -> ISM Rx |
| Band 7/13/14 | LTE FDD UL Tx -> GPS Rx |

With reference to Table 1, the inference pattern in the form of a→b represents a situation where transmission of "a" causes in-device coexistence interference against reception of "b". Therefore, for the band 40, transmission through the ISM band causes the in-device coexistence interference against downlink TDD reception of the LTE band (LTE TDD DL Rx). The in-device coexistence interference can be somewhat reduced by employing a filtering scheme but it is far from being satisfactory. If the FDM or TDM method is applied in addition to the filtering scheme, the in-device coexistence interference can be reduced more effectively.

Figure 5:
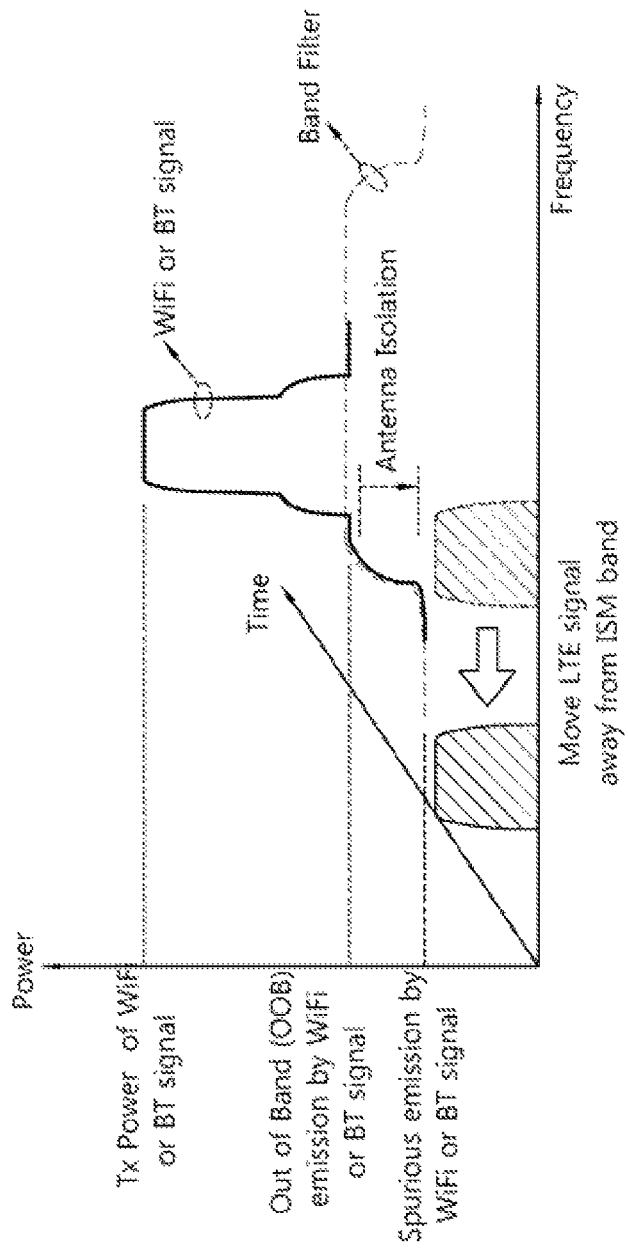
FIG. 5 is an example where in-device coexistence interference is reduced by using the FDM method.

FIG. 5 is an example where in-device coexistence interference is reduced by using the FDM method.

With reference to FIG. 5, the LTE band can be moved such that the LTE band does not overlap the ISM band. As a result, handover of the UE from the ISM band is induced. However, to implement the above, a method is required for legacy measurement or new signaling to trigger a mobility procedure or a radio link failure (RLF) procedure precisely.

Figure 6:
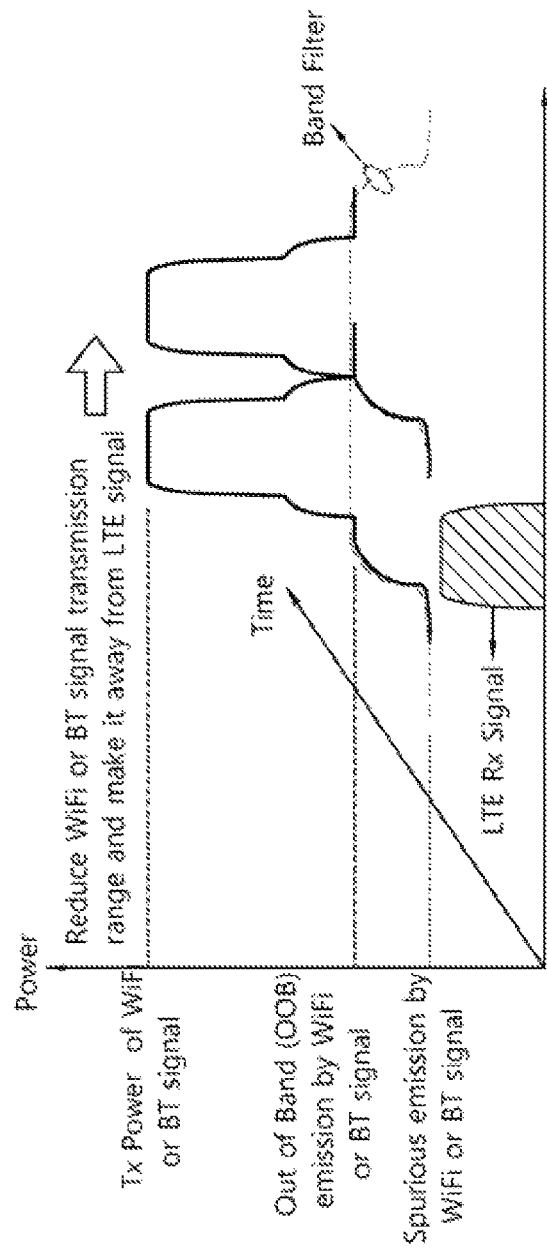
FIG. 6 is another example where in-device coexistence interference is reduced by using the FDM method.

FIG. 6 is another example where in-device coexistence interference is reduced by using the FDM method.

With reference to FIG. 6, the ISM band can be reduced and moved away from the LTE band. However, this may cause a backward compatibility problem. In the case of Bluetooth, the backward compatibility problem may be somewhat reduced owing to a frequency hopping mechanism; however, the backward compatibility problem may not be easily solved for WiFi.

Figure 7:
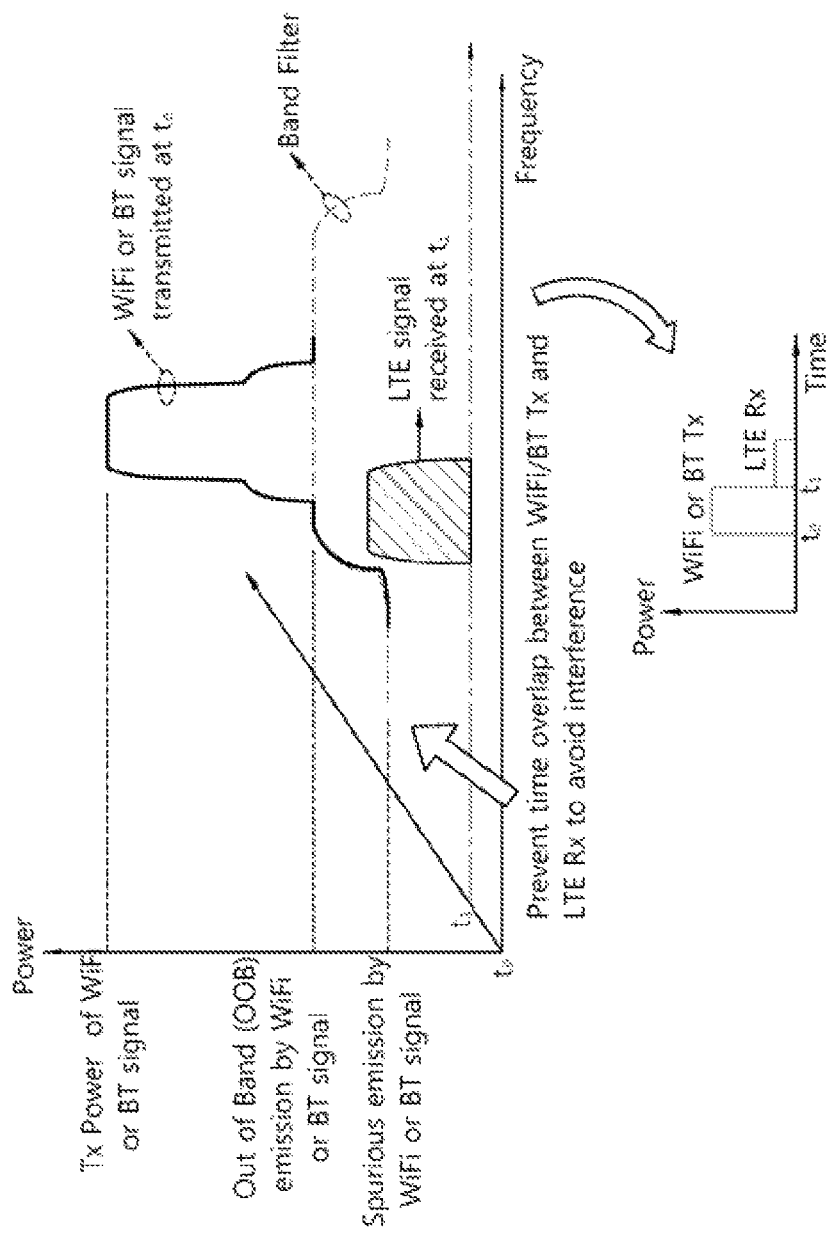
FIG. 7 is an example where in-device coexistence interference is reduced by using the TDM method.

FIG. 7 is an example where in-device coexistence interference is reduced by using the TDM method.

Figure 8:
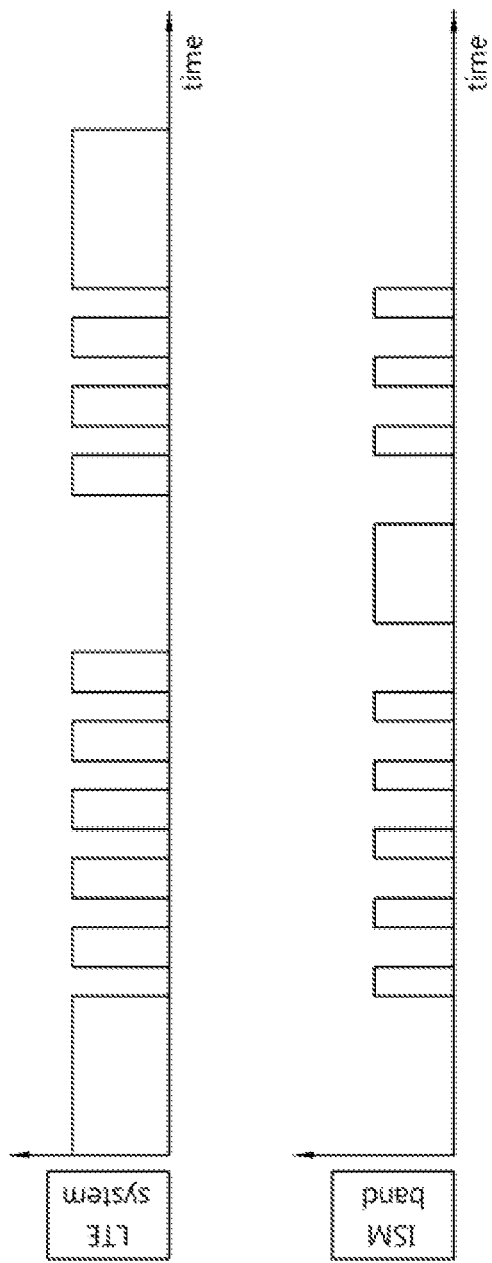
FIG. 8 illustrates a transmission and reception timing along the time axis of the LTE and the ISM band based on the TDM method.

With reference to FIG. 7, in-device coexistence interference can be avoided even without avoiding the interference delicate band if reception time in the LTE band is made not to overlap the reception time in the ISM band. For example, it is so structured that if a signal in the ISM band is transmitted at time $t_0$, a signal in the LTE band is received at time $t_1$. A transmission and reception timing of the LTE and the ISM band along the time axis based on the TDM method may be implemented as illustrated in FIG. 8. By employing the above method, the in-device coexistence interference can be avoided without moving between the LTE and the ISM band. From FIG. 8, a frequency range in each band through which signals are not transmitted is called a blank transmission area.

As described above, by using the methods illustrated in FIGS. 5 to 7, generation of in-device coexistence interference can be prevented to some degree. When the FDM method is employed, the UE can avoid the frequency delicate band. For example, suppose that CCs available for a system are CC1, CC2, and CC3 and an interference delicate band is CC3. A plurality of UEs can be handed over from CC3 to CC1 or CC2. If CC1 and CC2 get a relatively large load and in-device coexistence interference at CC3 is removed, an eNB should be able to carry out handover of the UE to CC3. This is because if the UE is simply denied for utilization because of the frequency delicate band, load balancing operation of the eNB may be hampered.

If the eNB attempts to allocate the CC3 or the UE is to be handed over to the CC3, an exact measurement report on the CC3 is required. However, a measurement report in a frequency delicate band usually reveals low accuracy due to interference drastically changing according to data transmission. This is based on the fact that a measurement report may depend not only on channel conditions of a network (e.g., the LTE system) affected by interference but also the channel conditions of a network (e.g., WiFi/Bluetooth system) generating the interference.

Handover based on a measurement report in a frequency delicate band may cause a ping-pong phenomenon for an UE. For example, a channel is regarded to be in good conditions if measurement is performed when in-device coexistence interference does not exist. Therefore, if channel conditions rapidly deteriorate due to occurrence of in-device coexistence interference after the UE has been handed over to a frequency delicate band, the UE may suffer the ping-pong phenomenon of returning to a different frequency band. Therefore, a new form of apparatus and method for performing measurement reporting robust to interference and specific to a frequency delicate band are required.

Related to the present invention, to avoid the in-device coexistence interference, a frequency division multiplexing (FDM) method and a time division multiplexing (TDM) method may be used. If interference occurs between a first frequency band of a first network system and a second frequency band of a second network system, the FDM method coordinates in-device coexistence interference by moving the frequency band of one of the two network systems. Meanwhile, the TDM method coordinates in-device coexistence interference by separating the transmission time of a first network system and the reception time of a second network system.

Figure 9:
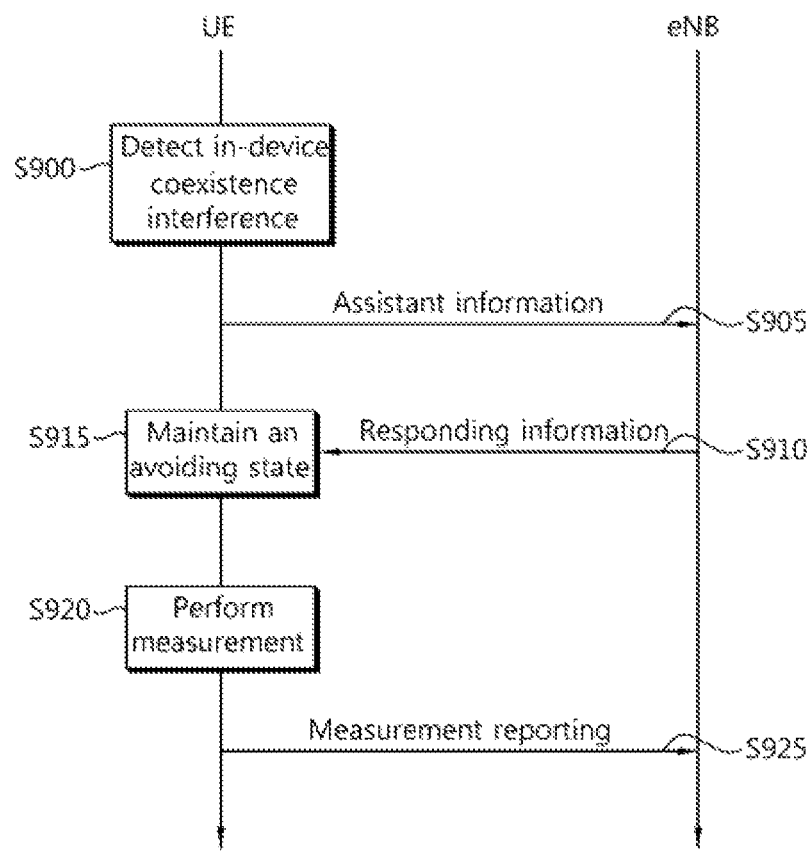
FIG. 9 is a flow diagram illustrating a method for performing a measurement reporting considering in-device coexistence interference according to one example of the present invention.

FIG. 9 is a flow diagram illustrating a method for performing a measurement reporting considering in-device coexistence interference according to one example of the present invention.

According to FIG. 9, a UE detects in-device coexistence interference in an interference delicate band at step S900. At this time, the interference delicate band may correspond to a CC or a serving cell. In-device coexistence interference corresponds to a case where transmission of signals from the UE to nearby devices communicating through Bluetooth or WiFi causes interference against reception of the UE from an eNB of the LTE system. In a situation such as shown in the FIG. 2, the UE detects whether a transmission signal of other RF modules develops interference from a reception signal of the LTE RF module. As one example, the UE can detect in-device coexistence interference by using signal-to-interference noise ratio (SINR). For example, suppose the UE transmits a signal y through a different RF module such as WiFi while receiving a signal x from an eNB through the LTE RF module. At this time, if SINR of the signal y is large more than a predetermined threshold value to exert as interference on the signal x, the UE can detect occurrence of the in-device coexistence interference. As another example, the UE can detect the in-device coexistence interference by using Reference Signal Received Power (RSRP) or Reference Signal Received Quality (RSRQ).

If in-device coexistence interference is detected or there is a potential chance of detection of the interference, the UE transmits assistant information for reducing, avoiding, or removing the interference to the eNB at step S905. In what follows, the operation of reducing, avoiding, or removing interference is collectively called interference coordination. The assistant information is the information required for coordinating in-device coexistence interference, which the eNB may regard the assistant information as an interference coordination request from the UE. The assistant information may correspond to a message generated from an Radio Resource Control (RRC) layer or a Medium Access Control (MAC) layer; or signaling originating from a physical layer. The assistant information includes a reactive indication indicating that in-device coexistence interference has been actually detected and a proactive indicator indicating a potential probability of developing the in-device coexistence interference.

The proactive indicator is transmitted to the eNB to indicate potential interference when unacceptably severe interference for the UE occurs in the interference delicate band. Potential interference only denotes a possibility of occurrence of in-device coexistence interference after the instant the proactive indicator is transmitted but does not imply actual occurrence.

As one example, an interference delicate band (or a unusable band) may be defined as a frequency band having potential for interference to develop and may be indicated by the proactive indicator. Therefore, handover to the interference delicate band or carrying out RRC configuration or reconfiguration is not unattainable; measurement according to the present invention can be performed on the interference delicate band. Conversely, a usable frequency band corresponds to the band where the in-device coexistence interference does not occur. However, according to handover or a transmission pattern, the usable frequency band may be changed to a unusable frequency band.

Also, the assistant information may include a measurement result performed by the UE.

The eNB transmits responding information at step S910. The responding information includes handover indication information for an UE to be handed over from an interference delicate band $f_1$ to another frequency band $f_2$ or scheduling or reconfiguration information for allocating the UE to a different frequency band $f_2$. At this time, the handover includes changing a main serving cell allocated for the UE from a current serving cell to another serving cell.

The UE carries out operation for avoiding an interference delicate band according to the responding information and maintains an avoiding state until the eNB issues a separate instruction or command at step S915. Avoiding an interference delicate band includes the UE's carrying out handover from the interference delicate band $f_1$ to another frequency band $f_2$ or carrying out communication by receiving a different frequency band. The avoiding state may be called a unusable state and also be described such that the corresponding interference delicate band stays in a proactive state due to supporting information or proactive indication.

Even through the UE may stay in an avoiding state against the interference delicate band, the UE performs measurement in the interference delicate band at step S920. Measurement in the interference delicate band differs from conventional measurement. For example, the UE obtains measurement samples and applies filtering to a plurality of measurement samples as shown in Equation 1 and estimates a measurement value to be reported.

$$F_n = (1-a) \cdot F_{n-1} + a \cdot M_n \qquad \text{[equation 1]}$$

In equation 1, $M_n$ is the most recent measurement sample; $F_n$ is a measurement value to be reported through measurement reporting; $F_{n-1}$ is a measurement value reported in a previous measurement reporting; "a" is $\frac{1}{2}^{(k/4)}$, where k is a filter coefficient used for filtering.

A measurement sample is a measurement value in units of subframes, which is a variable necessary to derive a measurement value to be reported through measurement reporting. Alternatively, the measurement sample denotes a measurement value about a subframe selected by measurement rules defined by a wireless system among measurement values about all the subframes received by the UE. The measurement sample can be obtained from a physical layer of the UE and filtering can be performed in an upper layer of the UE, for example a radio resource control (RRC) layer.

Measurement samples may be obtained continuously at each subframe. Also, measurement samples may be obtained intermittently as long as conditions imposed by the UE's capacity or system. That is, after one measurement sample is obtained, another measurement sample may be obtained after a predetermined time interval. In this case, measurement samples are not obtained for some of subframes. The time interval can be periodic or aperiodic.

If measurement rules for obtaining measurement samples are different, measurement values to be reported may be varied. To increase reliability of measurement reporting in an interference delicate band, the UE can secure measurement samples based on various measurement rules. Detailed descriptions about obtaining measurement samples will be provided later.

The UE transmits a measurement report including measurement values and/or measurement rule information to be reported to the eNB at step S925. Measurement values to be reported are those values calculated based on measurement samples, for example, as shown in equation 1. Measurement rule information is the information indicating measurement rules with which measurement samples are obtained. For example, measurement rules include a measurement rule for obtaining measurement samples based on the TDM scheme, a measurement rule for obtaining measurement samples including in-device coexistence interference, or a measurement rule for obtaining measurement samples not including the in-device coexistence interference.

The eNB can obtain measurement values about the interference delicate band from a measurement report and perform a subsequent procedure such as handover of an UE, RRC connection reconfiguration, or scheduling for resource allocation in the interference delicate band (not shown in the figure).

Now, measurement rules for an UE to obtain measurement samples will be described in detail. In what follows, for the convenience of description, in-device coexistence interference is defined to be the interference caused by transmission through a first frequency band of a first network system (e.g., transmission through the ISM band) against reception through a second frequency band of a second network system (e.g., reception through the LTE band).

Figure 10:
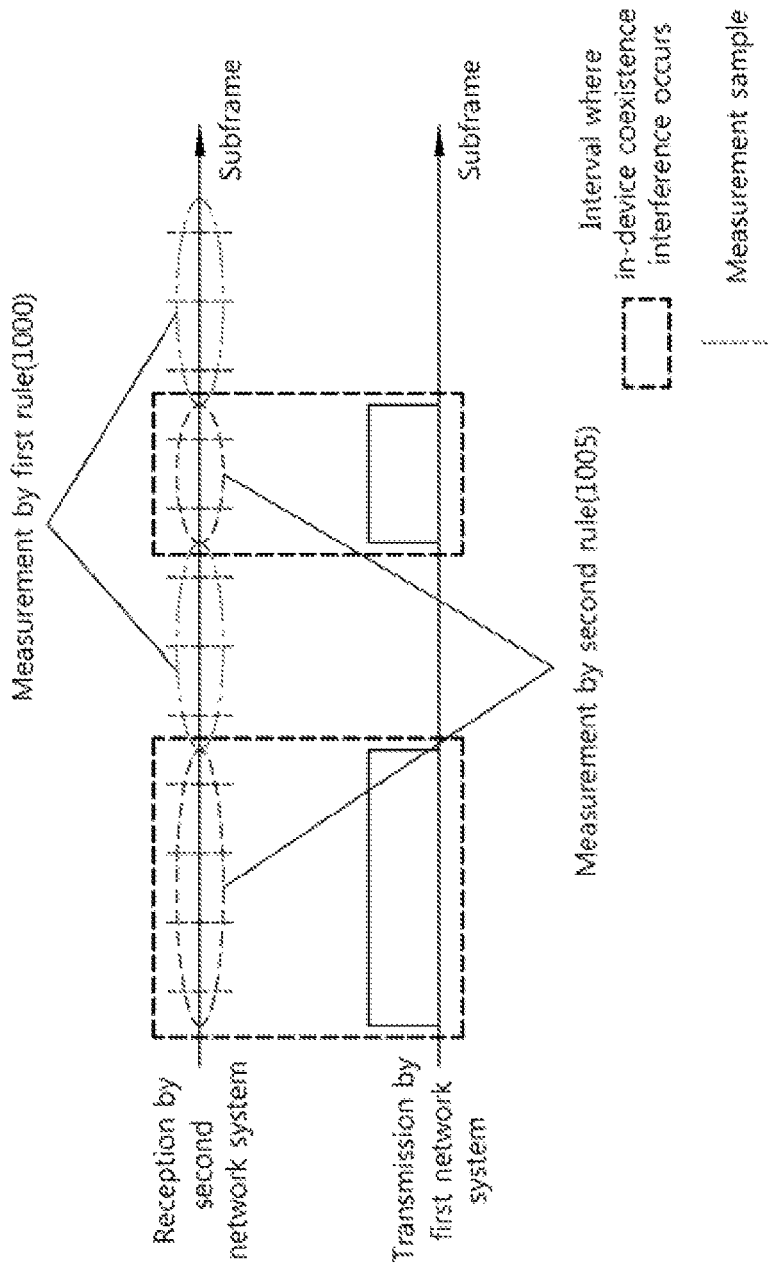
FIG. 10 illustrates measurement rules with which measurement samples in an interference delicate band are obtained according to one example of the present invention.

FIG. 10 illustrates measurement rules with which measurement samples in an interference delicate band are obtained according to one example of the present invention.

With reference to FIG. 10, an UE can obtain measurement samples based on a first measurement rule 1000. For example, the UE does not attempt to obtain measurement samples in an interval where in-device coexistence interference occurs (hereinafter, it is called an interference interval) but obtains measurement samples about a second network system in an interval where the in-device coexistence interference does not occur (hereinafter, it is called a non-interference interval). At this time, the UE can obtain measurement samples in the non-interference interval for each subframe, predetermined subframes, or arbitrary subframes.

Also, the UE can obtain measurement samples based on a second measurement rule 1005. For example, the UE obtains measurement samples about a second network system in a non-interference interval in the same way as the first measurement rule and obtains measurement samples by removing in-device coexistence interference in an interference interval by using an interference removal method. Therefore, measurement samples in a non-interference interval will be measurement values solely about the second network system. A specific interference removal method belongs to implementation issues of an UE and an arbitrary interference removal method may be used for the implementation of the second measurement rule.

As one example of an interference removal method, UE may remove interference by holding transmission of ISM band about the measurement samples. Holding transmission of ISM band means that ISM transmitter reduces transmission power to the extent of not interfering LTE receiver, transmits nothing, or postpones transmission for another subframe. The extent of not interfering LTE receiver means, for example, the extent of relatively low interference value which is at least 10 dB lower than signal. Postponing transmission for another subframe means postponing transmission of ISM band which is generated in the same time of current subframe of LTE band till the time of a subframe of LTE band which does not effect to measurement samples. Or, ISM transceiver transmits nothing to protect measurement samples of the LTE band. Refusing method of transmission may reduce quality of communication in ISM band a certain level, but, effects of refusing method can be ignorable because situation of refusing occurs rarely.

When measurement reporting is performed based on measurement samples due to the first or the second measurement rule, the UE may inform the eNB of channel values solely of the second network system in the interference delicate band.

When measurement samples are obtained based on RSRQ or RSRP, measurement samples due to the first and the second measurement rule may be expressed conceptually as follows.

$$\text{Measurement Sample} = \frac{S}{I+N} \quad \text{[equation 2]}$$

In equation 2, S represents strength of a received signal of a second network system; I represents strength of an interference signal (which is not related to in-device coexistence interference) exerted on the second network system; and N represents strength of noise. In other words, measurement samples imply a relative ratio of interference of a received signal to noise. Specific implementation follows the procedure of implementing the corresponding concept of a wireless system.

When measurement samples are obtained based on RSRP, measurement samples due to the first and the second rule are expressed conceptually as shown in equation 3.

$$\text{Measurement Sample} = S \quad \text{[equation 3]}$$

In equation 3, S represents strength of a received signal of a second network system. In other words, S represents strength of a received signal in the corresponding serving cell of the second network system. Specific implementation follows the procedure of implementing the corresponding concept of a wireless system.

Figure 11:
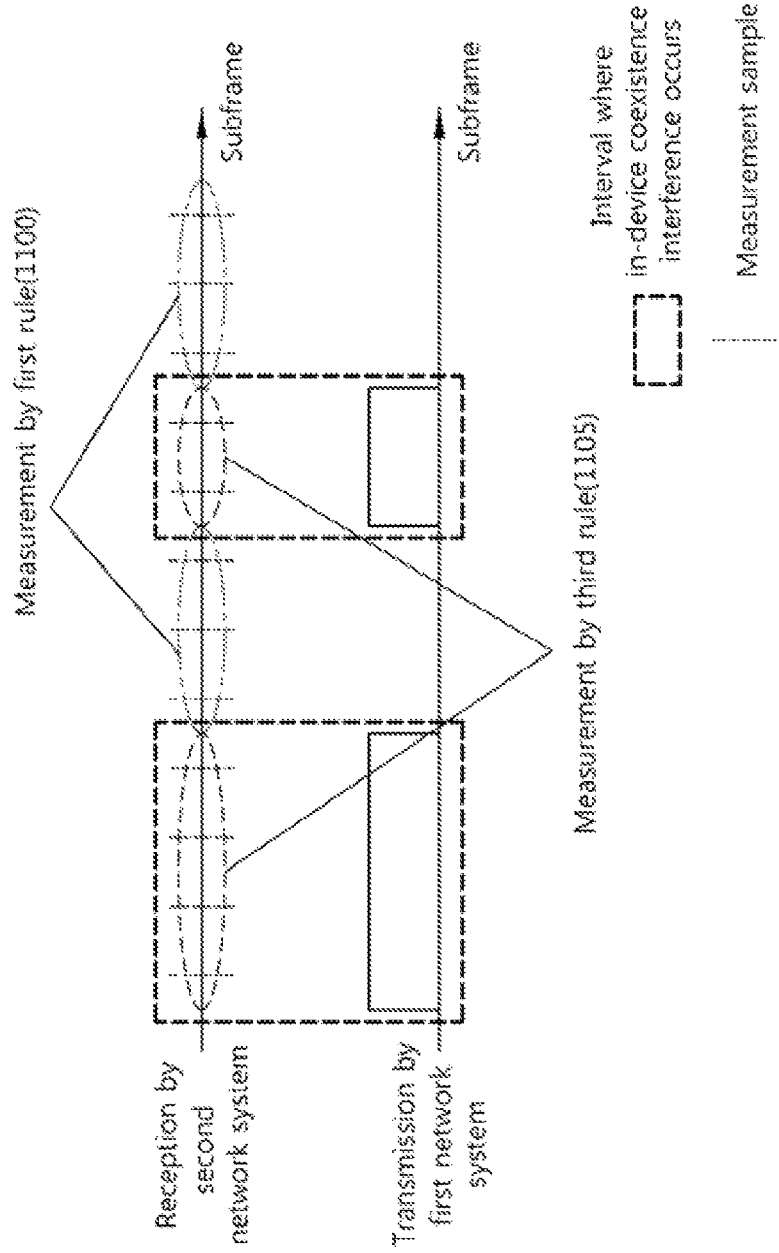
FIG. 11 illustrates measurement rules with which measurement samples in an interference delicate band are obtained according to another example of the present invention.

FIG. 11 illustrates measurement rules with which measurement samples in an interference delicate band are obtained according to another example of the present invention.

With reference to FIG. 11, the UE obtains measurement samples based on the first measurement rule in a non-interference interval 1100 but obtains measurement samples in an interference interval based on a third measurement rule 1105.

According to the third measurement rule, the UE can obtain two types of measurement samples from the equivalent subframe. As one example, the UE obtains a first measurement sample about an in-device coexistence interference signal itself due to the first network system and a second measurement sample about a signal of the second network system, respectively. In other words, the UE obtains the first measurement sample by extracting only the signal of the first network system from the interference interval and obtains the second measurement sample by using an interference removal method which extracts only the signal of the second network system. In this case, the first measurement sample can be expressed conceptually as shown in equation 4.

$$1st \text{ Measurement Sample} = I' \quad \text{[equation 4]}$$

In equation 4, I' represents strength of in-device coexistence interference. In other words, the UE obtains the first measurement sample by measuring only the strength of interference due to the first network in an interference interval while the UE obtains the second measurement sample by using an interference removal method which extracts only the signal of the second network system.

As another example, the UE attempts to obtain the first measurement sample reflecting the in-device coexistence interference signal and attempts to obtain the second measurement sample about the signal of the second network system by removing interference. In this case, the first measurement sample can be expressed conceptually as shown in equation 5 and the second measurement sample can be expressed conceptually as shown in equation 2.

$$1st \text{ Measurement Sample} = \frac{S}{I+N+I'} \quad \text{[equation 5]}$$

In equation 5, I' represents strength of in-device coexistence interference. In other words, the UE obtains the first measurement sample without applying an interference removal method in an interference interval while the UE obtains the second measurement sample by using the interference removal method which extracts only the signal of the second network system. In this case, no restrictions are imposed on the measurement sample.

Now, a method for obtaining two kinds of measurement values used for measurement reporting by using the obtained measurement samples obtained in the FIG. 11 will be described.

As one example, one measurement value is obtained by filtering the second measurement samples obtained through the third measurement rule and measurement samples obtained through the first measurement rule. Another measurement value is obtained by filtering the first measurement samples obtained through the third measurement rule and measurement samples obtained through the first measurement rule.

As another example, one measurement value is obtained by filtering the second measurement sample obtained through the third measurement rule and measurement samples obtained through the first measurement rule. Another measurement value is obtained by using only the first measurement samples obtained through the third measurement rule.

The third measurement rule above may be applied not only for interference coordination based on the FDM scheme but also interference coordination based on the TDM scheme.

According to the third measurement rule, a measurement report may include measurement rule information. The measurement rule information can indicate that the measurement repot includes a measurement value considering in-device coexistence interference. For example, the measurement rule information indicates that the measurement value is obtained based on a measurement sample considering in-device coexistence interference. In this case, the measurement repot includes a measurement sample solely about the second network system not including in-device coexistence interference and a measurement sample including the in-device coexistence interference.

Meanwhile, the measurement report may not include measurement rule information. In this case, if a measurement report about an interference delicate band is received, the eNB recognizes implicitly that the measurement report includes a measurement value considering in-device coexistence interference.

In what follows, a method for performing measurement based on the TDM scheme is described in detail. A UE can perform conventional measurement for frequency bands other than an interference delicate band but perform measurement based on the TDM scheme for the interference delicate band. Performing measurement based on the TDM scheme implies that measurement in the interference delicate band is performed in a time-division manner. For example, measurement is not performed in a first time interval whereas measurement is performed for a second time interval.

Figure 12:
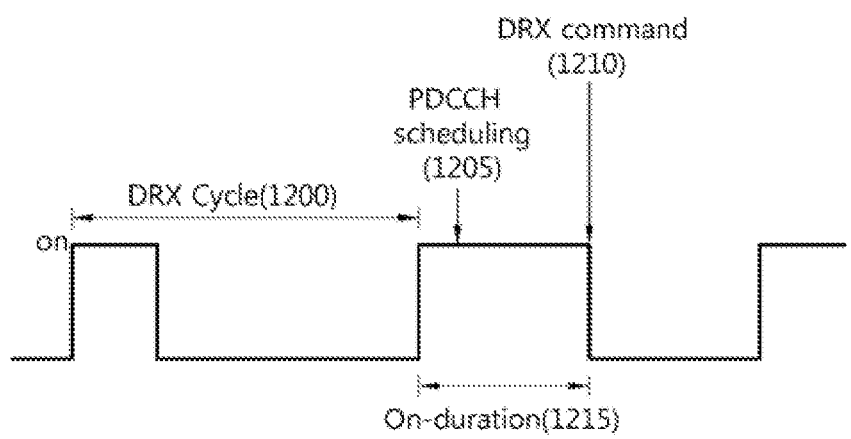
FIG. 12 illustrates measurement rules with which measurement samples in an interference delicate band are obtained according to yet another example of the present invention.

FIG. 12 illustrates measurement rules with which measurement samples in an interference delicate band are obtained according to yet another example of the present invention. FIG. 12 illustrates a case where an UE performs measurement about an interference delicate band based on a discontinuous reception (hereinafter, it is called DRX) mode.

With reference to FIG. 12, the UE may operate in the DRX mode where the UE does not receive a signal for a predetermined time period in accordance to a predetermined DRX cycle 1200. Parameters determining the DRX mode include DRX cycle 1200, on-duration time 1215, and inactivity timer. The DRX cycle 1200 is a period at which the UE wakes up from the DRX mode. The on-duration time 1215 corresponds to the time period for which the UE maintains the wake-up state periodically.

The UE can determine whether a PDCCH scheduled to itself 1205 exists during the on-duration time. If scheduling meant for the UE during the on-duration time is found, the UE maintains a wake-up state until the scheduling is fulfilled and performs measurement by obtaining measurement samples. The instant the scheduling is completed will be the time point at which the inactivity timer is expired from the time point of the initial PDCCH scheduling (i.e., DRX ordering time 1210). On the other hand, if PDCCH scheduling for the on-duration time is not found, the UE enters inactivity time of the DRX mode again after the on-duration time is passed. In this case, the UE does not perform measurement.

Meanwhile, the measurement report based on the measurement rule may include measurement rule information. The measurement rule information can indicate that a measurement value included in the measurement report has been obtained according to the measurement based on the TDM scheme. On the other hand, the measurement report may not include the measurement rule information. In this case, if a measurement report about an interference delicate band is received, the eNB implicitly recognizes that the measurement report includes a measurement value considering in-device coexistence interference.

Figure 13:
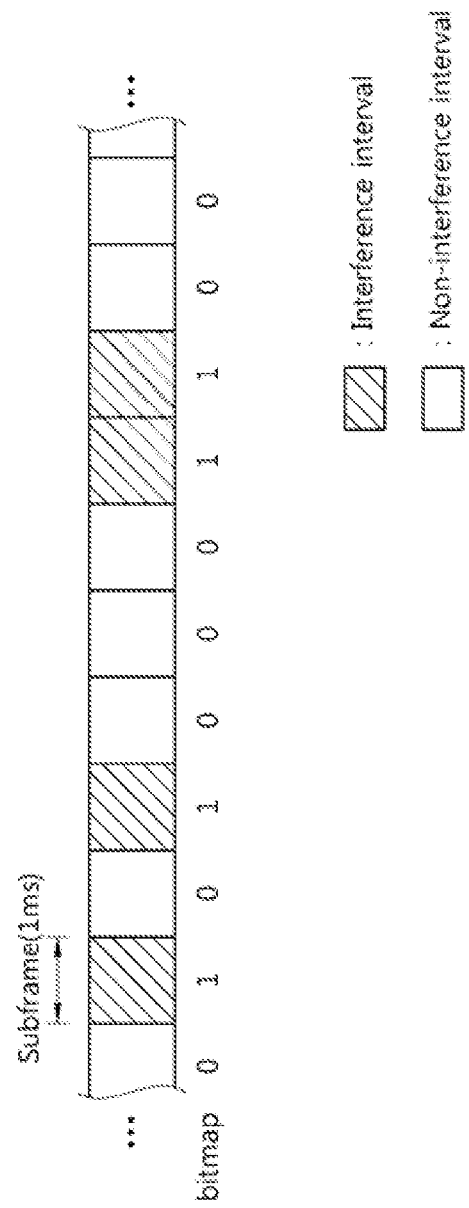
FIG. 13 illustrates measurement rules with which measurement samples in an interference delicate band are obtained according to still another example of the present invention.

FIG. 13 illustrates measurement rules with which measurement samples in an interference delicate band are obtained according to still another example of the present invention. FIG. 13 illustrates a case where a subframe where in-device coexistence interference occurs (interference interval) and a subframe without the interference (non-interference interval) are identified by bitmaps.

With reference to FIG. 13, if an interference interval is defined in units of subframes, one bit comprising a bitmap corresponds to one subframe. For example, if the bitmap is '1', it indicates that the corresponding subframe is an interference interval whereas if the bitmap is '0', the corresponding subframe is a non-interference interval. Surely, the bitmap '1' and '0' can be defined to have the opposite meaning of the above description. Although FIG. 13 assumes that the interference interval is defined in units of subframes; the assumption is only an example and a plurality of subframes may be grouped into a single interference interval to correspond to a single bit. The interference interval does not necessarily have to be in units of subframes but can be defined in units of arbitrary time periods such as 1.5 ms, 0.8 ms, etc. Furthermore, the bitmap '1' can be defined to indicate a usable interval whereas the bitmap '0' to indicate a unusable interval in view of the LTE system's availability or non-availability.

The UE may obtain a measurement sample according to a first measurement rule in a non-interference interval whereas the UE may obtain a measurement sample according to a second or a third measurement rule in an interference interval. A measurement sample according to the second measurement rule is a measurement value about a signal solely of the second network system by removing in-device coexistence interference as described above. Meanwhile, the measurement samples according to the third measurement rule include both the measurement samples by removing in-device coexistence interference and measurement samples considering in-device coexistence interference as described above.

A measurement report may include measurement rule information. As one example, measurement rule information may identify from which measurement rule among the first, the second and the third measurement rule a measurement value included in a measurement report has been obtained. As another example, the measurement rule information may indicate that a measurement value included in a measurement report has been obtained from measurement based on the TDM scheme. As yet another example, the measurement rule information may identify which TDM pattern a measurement value has been obtained from when the measurement value is obtained according to the measurement based on the TDM scheme.

In addition, a measurement report may not include measurement rule information. In this case, if a measurement report about an interference delicate band is received, an eNB implicitly recognizes that the measurement report includes a measurement value considering in-device coexistence interference.

Figure 14:
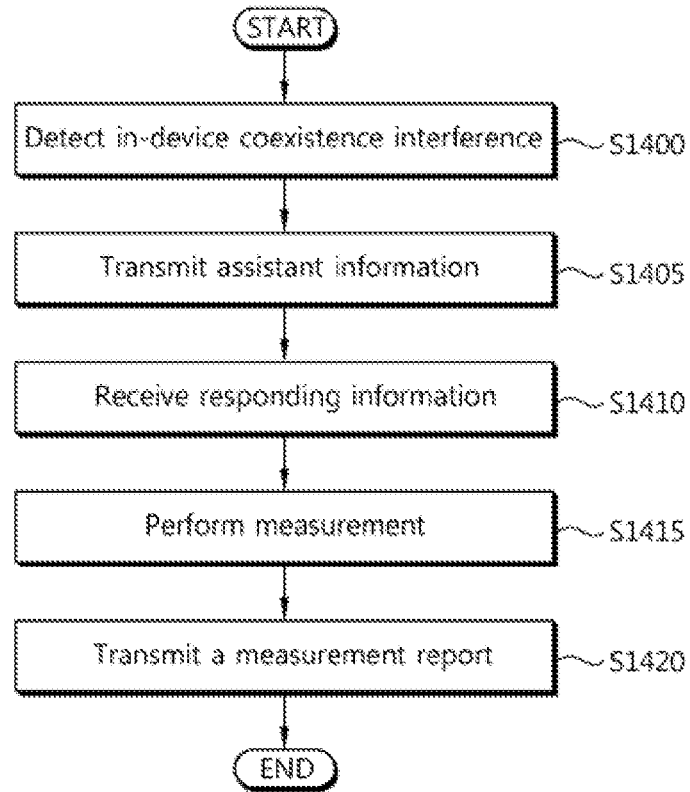
FIG. 14 is a flow diagram illustrating a method for performing measurement reporting considering in-device coexistence interference due to user equipments according to one example of the present invention.

FIG. 14 is a flow diagram illustrating a method for performing measurement reporting considering in-device coexistence interference due to user equipments according to one example of the present invention.

According to FIG. 14, a UE detects in-device coexistence interference in an interference delicate band $f_1$, at step S1400. At this time, $f_1$ may correspond to a CC or a serving cell. In-device coexistence interference corresponds to a case where transmission of signals to nearby devices communicating through Bluetooth or WiFi causes interference against reception of the UE from an eNB of the LTE system. As one example, the UE may detect in-device coexistence interference by using SINR. As another example, the UE may detect the in-device coexistence interference by using RSRP or RSRQ.

If in-device coexistence interference is detected or there is a potential possibility of detection of the interference, the UE transmits assistant information for coordinating interference to the eNB at step S1405. The assistant information is the information required for coordinating in-device coexistence interference, which the eNB may regard the assistant information as an interference coordination request from the UE. The assistant information may correspond to a message generated from an RRC layer or a MAC layer; or signaling originating from a physical layer. The assistant information includes a reactive indication indicating that in-device coexistence interference has been actually detected and a proactive indication indicating a potential probability of developing the in-device coexistence interference.

The UE receives responding information from the eNB at step S1410. The step S1410 may be omitted depending on situations. For example, if the UE and the eNB agree with each other such that an interference delicate band enters an avoiding state due to transmission of assistant information, the eNB may not transmit separate responding information. The responding information includes handover indication information for an UE to be handed over from an interference delicate band $f_1$ to another frequency band $f_2$ or scheduling or reconfiguration information for allocating the UE to a different frequency band $f_2$.

The UE performs measurement in an interference delicate band based on the first, the second or the third measurement rule or the TDM scheme while in an avoiding state about the interference delicate band at step S1415. Avoiding an interference delicate band includes the UE's carrying out handover from the interference delicate band $f_1$ to another frequency band $f_2$ or carrying out communication by receiving a different frequency band. The avoiding state may be called a unusable state and also be described such that the corresponding interference delicate band stays in a proactive state due to supporting information or proactive indicator.

The UE obtains measurement samples and derives a measurement value to be reported by filtering a plurality of measurement samples, for example, as shown in equation 1.

The UE transmits a measurement report including measurement values and/or measurement rule information to be reported to the eNB at step S1420. Measurement values to be reported are those values calculated based on measurement samples, for example, as shown in equation 1. Measurement rule information is the information indicating measurement rules with which measurement samples are obtained. For example, measurement rules include a measurement rule for obtaining measurement samples based on the TDM scheme, a measurement rule for obtaining measurement samples including in-device coexistence interference, or a measurement rule for obtaining measurement samples not including the in-device coexistence interference.

As one example, measurement rule information may identify from which measurement rule among the first, the second and the third measurement rule a measurement value included in a measurement report has been obtained. As another example, the measurement rule information may indicate that a measurement value included in a measurement report has been obtained from measurement based on the TDM scheme. As yet another example, the measurement rule information may identify which TDM pattern a measurement value has been obtained from when the measurement value is obtained according to the measurement based on the TDM scheme.

Figure 15:
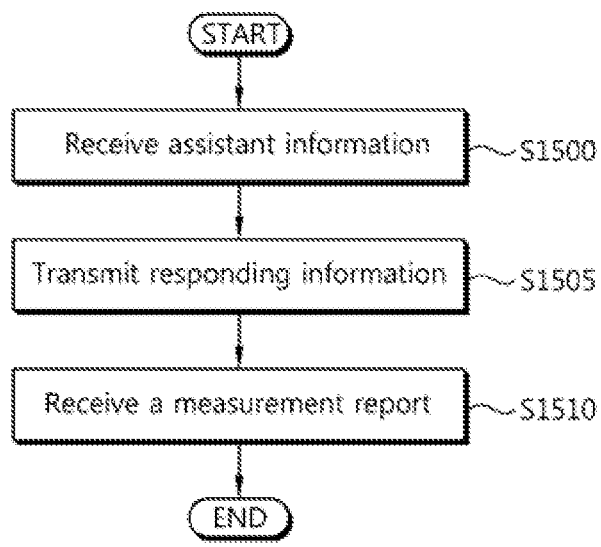
FIG. 15 is a flow diagram illustrating a method for receiving a measurement report considering in-device coexistence interference due to an eNB according to one example of the present invention.

FIG. 15 is a flow diagram illustrating a method for receiving a measurement report considering in-device coexistence interference due to an eNB according to one example of the present invention.

With reference to FIG. 15, the eNB receives assistant information from the UE at step S1500. The eNB transmits responding information to the UE at step S1505 and receives a measurement report from the UE at step S1510. The eNB may obtain measurement values about the interference delicate band from a measurement report and perform a subsequent procedure such as handover of an UE, RRC connection reconfiguration, or scheduling for resource allocation in the interference delicate band (not shown in the figure).

Figure 16:
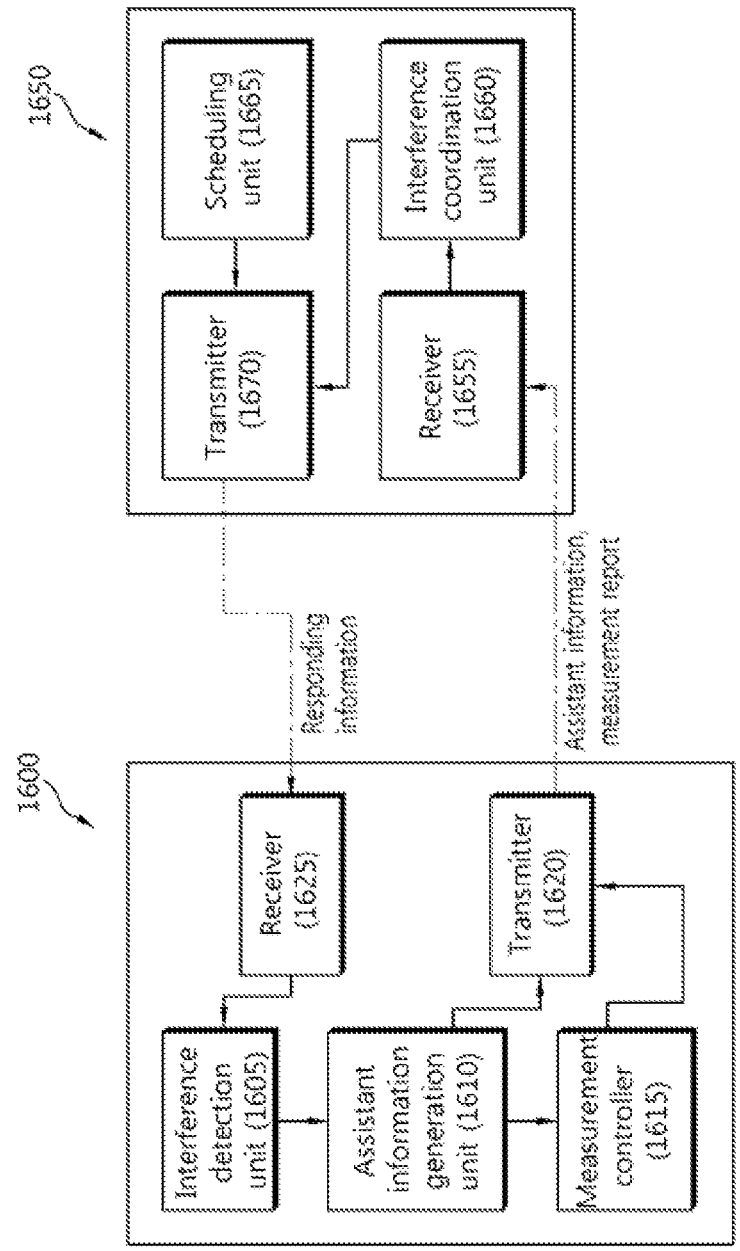
FIG. 16 is a block diagram illustrating a user equipment and an eNB performing measurement reporting considering in-device coexistence interference according to one example of the present invention.

FIG. 16 is a block diagram illustrating a UE and an eNB performing measurement reporting considering in-device coexistence interference according to one example of the present invention.

With reference to FIG. 16, the UE 1600 comprises an interference detection unit 1605, an assistant information generation unit 1610, a measurement controller 1615, a transmitter 1620, and a receiver 1625.

The interference detection unit 1605 detects in-device coexistence interference in an interference delicate band. At this time, $f_1$ may correspond to a CC or a serving cell. In-device coexistence interference corresponds to a case where transmission of signals from the UE 1600 to nearby devices communicating through Bluetooth or WiFi causes interference against reception of the UE 1600 from an eNB of the LTE system. In a situation such as shown in FIG. 2, the UE detects whether a transmission signal of other RF modules develops interference from a reception signal of the LTE RF module. As one example, the interference detection unit 1605 may detect in-device coexistence interference by using SINR. As another example, the interference detection unit 1605 may detect in-device coexistence interference by using RSRP or RSRQ. If the interference detection unit 1605 detects in-device coexistence interference or the receiver 1625 receives responding information from the eNB 1650, the interference detection unit 1605 controls the UE 1600 to be in an avoiding state against the interference delicate band. Avoiding an interference delicate band includes the UE 1600's carrying out handover from the interference delicate band $f_1$ to another frequency band $f_2$ or carrying out communication by receiving a different frequency band. The avoiding state may be called a unusable state and also be described such that the corresponding interference delicate band stays in a proactive state due to supporting information or proactive indicator.

The assistant information generation unit 1610 generates assistant information for coordinating interference if in-device coexistence interference is detected or there is a potential chance of detection of the interference. The assistant information is the information required for coordinating in-device coexistence interference, which the eNB 1650 may regard the assistant information as an interference coordination request from the UE 1600. The assistant information may correspond to a message generated from an RRC layer or a MAC layer; or signaling originating from a physical layer. The assistant information includes a reactive indication indicating that in-device coexistence interference has been actually detected and/or a proactive indicator indicating a potential probability of developing the in-device coexistence interference.

The measurement controller 1615 performs measurement in an interference delicate band based on the first to the third measurement rule or the TDM scheme while in an avoiding state about the interference delicate band. The measurement controller 1615 obtains measurement samples and derives a measurement value to be reported by filtering a plurality of measurement samples, for example, as shown in equation 1. And the measurement controller 1615 generates a measurement report including a measurement value and/or measurement rule information and transmits the report to the transmitter 1620.

The transmitter 1620 transmits the measurement report to the eNB 1650.

The receiver 1625 receives responding information from the eNB 1650. The responding information includes handover indication information for an UE to be handed over from an interference delicate band to another frequency band or scheduling or reconfiguration information for allocating the UE to a different frequency band.

The eNB 1650 comprises a receiver 1655, an interference coordination unit 1660, a scheduling unit 1665, and a transmitter 1670.

The receiver 1655 receives assistant information and/or a measurement report from the UE 1600.

The interference coordination unit 1660 determines whether to perform interference coordination based on assistant information and if interference coordination is needed, generates responding information and transmits the information to the transmitter 1670. As a criterion to determine whether to perform interference coordination, the interference coordination unit 1660 may determine whether to perform interference coordination through capacity of resources available in a different frequency band (hereinafter, it is called an avoiding band) other than the interference delicate band. To this purpose, the interference coordination unit 1660 may calculate the capacity of resources available in the avoiding band and may determine whether the capacity of resources available in the avoiding band is sufficient. If the capacity of resources available in the avoiding band is sufficient, the interference coordination unit 1660 generates responding information allowing the UE to move to the avoiding band.

The scheduling unit 1665 obtains a measurement value about an interference delicate band based on a measurement report; performs handover of the UE 1600, RRC connection reconfiguration, or scheduling for resource allocation in the interference delicate band based on the measurement value; generates a handover-related message, an RRC connection reconfiguration-related message, or a scheduling message; and transmits the message to the transmitter 1670.

The transmitter 1670 transmits responding information to the UE 1600.

The above descriptions provides only examples realizing the technical principles of the present invention; it should be understood for those skilled in the art that various modifications and revisions are possible without departing the inherent characteristics of the present invention. Therefore, the embodiments disclosed in this document are not meant to limit the technical principles of the present invention but to provide descriptions of the present invention; thus, the technical scope of the present invention is not limited by the embodiments. The technical scope of the present invention should be interpreted according to the appended claims; thus, all the technical principles within a scope equivalent to that defined by the claims should be interpreted to belong to the technical scope of the present invention.

The invention claimed is:

1. A communication method comprising:
  detecting In-Device Coexistence (IDC) interference;
  transmitting, to an evolved NodeB (eNB), an IDC indication indicating occurrence or expectation of the IDC interference;
  preparing a measurement report comprising measurement values, wherein the measurement values are obtained without the IDC interference; and
  transmitting, to the eNB, the measurement report.

2. The method of claim 1, wherein the IDC interference is caused by transmission through a first frequency of a first network being affected by reception through a second frequency of a second network.

3. The method of claim 1, further comprising receiving, from the eNB, responding information indicating coordination of the IDC interference based on the IDC indication.

4. The method of claim 3, wherein, the transmitting the measurement report is performed after receiving the responding information.

5. The method of claim 3, wherein the coordination of the IDC interference is based on FDM (Frequency Division Multiplexing).

6. The method of claim 3, wherein the coordination of the IDC interference is based on TDM (Time Division Multiplexing).

7. The method of claim 1, further comprising obtaining measurement samples for calculating the measurement values in a non-interference interval where the IDC interference does not occur.

8. A communication apparatus comprising:
  a memory; and
  a processor operably coupled to the memory, wherein the processor, when executing program instructions stored in the memory, is configured to:

detect In-Device Coexistence (IDC) interference;

cause the apparatus to transmit, to an evolved NodeB (eNB), an IDC indication indicating occurrence or expectation of the IDC interference;

prepare a measurement report comprising measurement values, wherein the measurement values are obtained without the IDC interference; and cause the apparatus to transmit, to the eNB, the measurement report.

9. The apparatus of claim 8, wherein the IDC interference is caused by transmission through a first frequency of a first network being affected by reception through a second frequency of a second network.

10. The apparatus of claim 8, wherein the processor is further configured to cause the apparatus to receive, from the eNB, responding information indicating coordination of the IDC interference based on the IDC indication.

11. The apparatus of claim 10, wherein the coordination of the IDC interference is based on FDM (Frequency Division Multiplexing).

12. The apparatus of claim 10, wherein the coordination of the IDC interference is based on TDM (Time Division Multiplexing).

13. The apparatus of claim 8, wherein the processor is further configured to cause the apparatus to obtain measurement samples for calculating the measurement values in a non-interference interval where the IDC interference does not occur.

14. A communication method comprising:

receiving, from a user equipment (UE), In-Device Coexistence (IDC) indication indicating occurrence or expectation of IDC interference;

transmitting, to the UE, responding information indicating coordination of the IDC interference based on the IDC indication; and receiving, from the UE, a measurement report comprising measurement values, wherein the measurement values are obtained without the IDC interference.

15. The method of claim 14, wherein the IDC interference is caused by transmission through a first frequency of a first network being affected by reception through a second frequency of a second network.

16. The method of claim 14, wherein the coordination of the IDC interference is based on FDM (Frequency Division Multiplexing).

17. The method of claim 14, wherein the coordination of the IDC interference is based on TDM (Time Division Multiplexing).

* * * * *